(12) United States Patent
Fujimoto

(10) Patent No.: US 7,855,870 B2
(45) Date of Patent: Dec. 21, 2010

(54) SOLID ELECTROLYTIC CAPACITOR

(75) Inventor: Kazumasa Fujimoto, Saga (JP)

(73) Assignees: Sanyo Electric Co., Ltd., Moriguchi-Shi (JP); Saga Sanyo Industries, Kishima-Gun (JP)

( * ) Notice: Subject to any disclaimer, the term of this patent is extended or adjusted under 35 U.S.C. 154(b) by 695 days.

(21) Appl. No.: 11/661,203

(22) PCT Filed: Apr. 19, 2005

(86) PCT No.: PCT/JP2005/007471

§ 371 (c)(1),
(2), (4) Date: Feb. 26, 2007

(87) PCT Pub. No.: WO2006/022049

PCT Pub. Date: Mar. 2, 2006

(65) Prior Publication Data

US 2008/0074827 A1   Mar. 27, 2008

(30) Foreign Application Priority Data

Aug. 25, 2004   (JP)   ............................. 2004-244624

(51) Int. Cl.
 H01G 4/32   (2006.01)
 H01G 9/145   (2006.01)
(52) U.S. Cl. .................. 361/530; 361/532; 361/529
(58) Field of Classification Search ........... 361/523, 361/525, 528, 530
See application file for complete search history.

(56) References Cited

U.S. PATENT DOCUMENTS 6,885,547 B2 * 4/2005 Nitta et al. .................. 361/512

FOREIGN PATENT DOCUMENTS

| JP | 4-35013 | | 2/1992 |
|---|---|---|---|
| JP | 04297012 A | * | 10/1992 |
| JP | 6-236831 | | 8/1994 |
| JP | 2003-77766 | | 3/2003 |
| JP | 2003-309042 | | 10/2003 |
| JP | 2004-47914 | | 2/2004 |
| JP | 2004-146707 | | 5/2004 |
| JP | 2004-235293 | | 8/2004 |
| JP | 2005-44587 | | 2/2005 |

OTHER PUBLICATIONS

Japanese Office Action mailed May 11, 2010, with English Translation.

* cited by examiner

*Primary Examiner*—Eric Thomas
(74) *Attorney, Agent, or Firm*—Kratz, Quintos & Hanson, LLP

(57) ABSTRACT

A solid electrolytic capacitor (1) is prepared by carbonizing a wound element (21) formed by winding an anode foil (22) and a cathode foil (23) together with a separator paper (4) sandwiched therebetween, and forming a solid electrolyte layer, including said separator (4), including a conductive polymer between the anode foil (22) and the cathode foil (23). The separator paper (4) is paper prepared by mixing fibers having low heat resistance and carbonized by said carbonizing, and fibers having high heat resistance not carbonized by said carbonizing, and fibrillated fibers having narrow spaces between fibers are used as said fibers having high heat resistance. The solid electrolytic capacitor has an excellent ESR characteristic, in which a dense solid electrolyte layer can be formed by a chemical polymerization method.

3 Claims, 2 Drawing Sheets

Figure 3

|  | Mixing ratio of separator paper (%) | | Cap. (µF) | Tan δ (%) | ESR (mΩ) | LC (µA) |
| --- | --- | --- | --- | --- | --- | --- |
|  | Paper with high heat resistance | Paper with low heat resistance |  |  |  |  |
| Example 1 | 10 | 90 | 22.3 | 1.0 | 28 | 18 |
| Example 2 | 50 | 50 | 22.3 | 1.0 | 30 | 19 |
| Example 3 | 90 | 10 | 22.1 | 1.0 | 33 | 18 |
| Example 4 | 10 | 90 | 22.4 | 1.0 | 29 | 21 |
| Example 5 | 50 | 50 | 22.3 | 1.0 | 32 | 19 |
| Example 6 | 90 | 10 | 22.3 | 1.0 | 34 | 20 |
| Conventional Example 1 | - | 100 | 22.2 | 1.0 | 45 | 19 |
| Conventional Example 2 | 10 | 90 | 22.3 | 1.0 | 36 | 23 |

US 7,855,870 B2

SOLID ELECTROLYTIC CAPACITOR

TECHNICAL FIELD

The present invention relates to a solid electrolytic capacitor.

BACKGROUND ART

FIG. 1 is a sectional view of a conventional solid electrolytic capacitor (1), and FIG. 2 is an exploded perspective view of a capacitor element (2) in the solid electrolytic capacitor (1) of FIG. 1 (for example, Patent Document 1).

In this capacitor, the capacitor element (2) is housed in an aluminum case (3) opened at one end and an opening of the case (3) is sealed by a rubber sealing member (30). As shown in FIG. 2, the capacitor element (2) is composed of a wound element (21) formed by winding an anode foil (22) being aluminum foil provided with a chemical conversion coating and a cathode foil (23) being aluminum foil together into a roll with an insulating separator paper (4) sandwiched between the anode and the cathode, and a layer of solid electrolyte of such as a TCNQ (7,7,8,8-tetracyanoquinodimethane) complex salt or the like is formed inside. As another solid electrolyte layer, conductive polymers such as polypyrrole, polythiophene, polyfuran, polyaniline, and the like can be used.

A pair of tab terminals (25), (25) are drawn from the anode foil (22) and the cathode foil (23) and leads (20), (20) are extended from the tab terminals (25), (25). The leads (20), (20) are projected outward through the sealing member (30). The periphery of the opening of the case (3) is curled to hold the sealing member (30).

When the TCNQ complex salt is used as the solid electrolyte layer, the wound element (21) is impregnated with a solution of the TCNQ complex salt dissolved by heating, and then the wound element (21) is pulled out and cooled rapidly, thereby to be solidified to form the solid electrolyte layer. And, when the foregoing solid electrolyte layer comprising the conductive polymer is formed by a chemical polymerization method, the wound element (21) is impregnated with a mixed solution obtained by adding a monomer to a solution of an oxidizing agent, and then the wound element (21) is pulled out and dried to form a solid electrolyte layer between the anode foil (22) and the cathode foil (23).

A separator (4) is paper made of natural fiber and the wound element (21) is heated to elevated temperatures of about 150 to 300° C. to be carbonized after being wound into a roll. Voids of the separator paper (4) are increased and the density of the separator paper (4) is reduced by this carbonization. When the foregoing solid electrolyte layer is formed by a chemical polymerization method, the wound element (21) is impregnated with the mixed solution obtained by adding a monomer to a solution of an oxidizing agent, and then the impregnated wound element (21) is pulled out and dried to form the solid electrolyte layer between the anode foil (22) and the cathode foil (23). Therefore, the foregoing solution or mixed solution becomes easy to penetrate into the wound element (21).

It is conceivable that the wound element (21) is formed by using a separator paper (4) having a low density originally, but in such a case, there arises a problem that the strength of paper becomes low and the separator paper is broken in winding the wound element (21). Further, when the separator paper (4) is made of natural fiber, there is a problem that the wound element (21) loses its shape if the separator paper (4) is subjected to carbonization.

As a method of solving these problems, the present applicant has proposed a method in which by using, as a separator, paper prepared by mixing synthetic fibers having a melting point higher than a carbonization temperature or not having a melting point in natural fibers, the separator paper (4) is not broken in winding the wound element (21), the wound element (21) is prevented from losing its shape during the carbonization, and the foregoing mixed solution becomes easy to penetrate into the wound element (21) (for example, Patent Document 2).

Patent Document 1: Japanese Unexamined Patent Publication No. 6-236831
Patent Document 2: Japanese Unexamined Patent Publication No. 2004-146707

DISCLOSURE OF THE INVENTION

Problem to be Solved by the Invention

When the method described in Patent Document 2 is employed, voids of the wound element (21) into which a mixed solution penetrates and in which a solid electrolyte layer is formed are present. But, since, due to carbonization, spaces between fibers within a separator become broader than that before carbonization, when a solid electrolyte layer comprising a conductive polymer is formed, a power holding the mixed solution during a time period from impregnating the foregoing wound element (21) with the foregoing mixed solution to pulling out and drying the wound element (21) is reduced. Therefore, there was a problem that a dense solid electrolyte layer cannot be formed and an ESR (equivalent series resistance) characteristic is deteriorated. In particular, when polythiophene or derivatives thereof, having a lower polymerization rate than polypyrrol, is used as a material for a conductive polymer, the deterioration of the ESR characteristic due to the reduction in the mixed solution-holding power of the separator paper occurs remarkably.

And so, it is an object of the present invention to provide a solid electrolytic capacitor having an excellent ESR characteristic, in which a dense solid electrolyte layer can be formed by a chemical polymerization method.

Means for Solving the Problem

The present invention pertains to a solid electrolytic capacitor prepared by carbonizing a wound element (21) formed by winding an anode foil (22) and a cathode foil (23) together with a separator paper (4) sandwiched therebetween, and forming a solid electrolyte layer, including the foregoing separator (4), comprising a conductive polymer between the anode foil (22) and the cathode foil (23), wherein the separator paper (4) is paper prepared by mixing fibers having low heat resistance and carbonized by the foregoing carbonization, and fibers having high heat resistance and not carbonized by the foregoing carbonization, and fibrillated fibers having portions where spaces between fibers are narrow are used as the foregoing fiber having high heat resistance.

EFFECT OF THE INVENTION

By utilizing the present invention, by carbonization, the density of the separator paper is decreased and the voids into which the mixed solution penetrates are produced, and fibrillated fibers, which are not carbonized, having portions where spaces between fibers are narrow remain, thereby maintaining a high holding power. Therefore, it becomes possible to form the dense solid electrolyte layer and improve the ESR characteristic.

BEST MODE FOR CARRYING OUT THE INVENTION

Hereinafter, an example of the present invention will be described in detail referring to drawings.

As with a conventional capacitor element, a capacitor element (2) of a solid electrolytic capacitor (1) is composed of a wound element (21) formed by winding an anode foil (22) being aluminum foil provided with a chemical conversion coating and a cathode foil (23) being aluminum foil together into a roll with an insulating separator paper (4) sandwiched therebetween and attaching these foils fixedly with a roll-fastening tape (26) as shown in FIG. 2. As a separator paper (4), paper prepared by mixing fibers having low heat resistance, which are carbonized by carbonization, and fibers having high heat resistance, which are not carbonized by carbonization is used, and specifically, paper prepared by mixing 10% of aromatic polyamide as the fibers having high heat resistance and 90% of natural fibers which are predominantly composed of Manila hemp as the fibers having low heat resistance was used.

Here, fibers in which spaces between fibers are narrower than the foregoing fibers were used for aromatic polyamide. Specifically, fibrillated fibers having portions divided extremely finely were used. Fibrillation means a phenomenon in which fibrils within a fiber come to the surface due to the effect of friction and are fuzzed and frayed. The fiber consists of a bundle of several thousands fibrils, and fibrils converge to a bundle passably since a hydrogen bond or an intermolecular force acts between fibrils, but fibrils come out like whiskers if an external force, particularly friction in a wet condition, is applied.

In the examples, fibrillated fibers, in which a fiber diameter of at least a part of the fibers becomes 1 μm or less by spreading the foregoing aromatic polyamide fibers by beating, were used.

The fiber having high heat resistance may be applicable as long as its melting point or thermal decomposition temperature is higher than a carbonization temperature, and other examples include polyimide and polyphenylenesulfide (PPS), having high heat resistance. Examples of the fibers having low heat resistance include fibers having a low melting point or low thermal decomposition temperature such as polyolefin fibers in addition to natural fibers such as vegetable fiber, animal fiber, and the like.

The solid electrolytic capacitor (1) is formed as shown below.

A wound element (21) is prepared, a section conversion treatment is applied to the wound element (21) and then the wound element (21) is carbonized at a temperature of 260° C. or higher, specifically 280° C. Herein, the section conversion treatment refers to performing a conversion treatment again to repair chemical conversion coatings damaged in winding the anode foil (22) or to form chemical conversion coatings on the end face of an anode foil (22) not provided with chemical conversion coatings.

Then, 3,4-ethylenedioxythiophene as a monomer is added to a solution of an oxidizing agent formed by adding ferric p-toluenesulfonate as an oxidizing agent to butanol to form a mixed solution. The foregoing wound element (21) is impregnated with the mixed solution, and then the wound element (21) is pulled out and dried, and thereby a solid electrolyte layer is formed in a space including the separator paper (4) between the anode foil (22) and the cathode foil (23). The capacitor element (2) is thus obtained.

Then, as shown in FIG. 1, leads (20), (20) of the capacitor element (2) are fit in a sealing member (30), the capacitor element (2) is housed in a case (3), and the periphery of the opening of the case (3) is swaged and curled. A plastic seat plate (31) is placed from above the sealing member (30), the leads (20), (20) are bent radially-outwardly to abut on the seat plate (31) to obtain a solid electrolytic capacitor (1).

The present applicant took the above-mentioned capacitor (1) using a separator paper (4) prepared by mixing 10% of aromatic polyamide as the fibers having high heat resistance and 90% of natural fibers which are predominantly composed of Manila hemp as the fibers having low heat resistance as Example 1. The aromatic polyamide is fibrillated as described above.

And, a capacitor (1) using a separator paper (4) prepared by mixing 50% of aromatic polyamide as the fibers having high heat resistance and 50% of cellulose fibers as the fibers having low heat resistance was produced, which was taken as Example 2.

And, a capacitor (1) using a separator paper (4) prepared by mixing 90% of aromatic polyamide as the fibers having high heat resistance and 10% of cellulose fibers as the fibers having low heat resistance was produced, which was taken as Example 3.

And, a capacitor (1) using a separator paper (4) prepared by mixing 10% of aromatic polyamide as the fibers having high heat resistance and 90% of polyolefin fibers as the fibers having low heat resistance was produced, which was taken as Example 4.

And, a capacitor (1) using a separator paper (4) prepared by mixing 50% of aromatic polyamide as the fibers having high heat resistance and 50% of polyolefin fibers as the fibers having low heat resistance was produced, which was taken as Example 5.

And, a capacitor (1) using a separator paper (4) prepared by mixing 90% of aromatic polyamide as the fibers having high heat resistance and 10% of polyolefin fibers as the fibers having low heat resistance was produced, which was taken as Example 6.

Further, a capacitor (1) was produced using a separator paper (4) prepared by using 100% of natural fibers which are predominantly composed of Manila hemp as Conventional Example 1.

Further, a capacitor (1) was produced using a separator paper (4) prepared by mixing 10% of acrylic fibers not fibrillated as the fibers having high heat resistance and 90% of natural fibers which are predominantly composed of Manila hemp as the fibers having low heat resistance as Conventional Example 2.

The capacitors of Examples 1 to 6 and Conventional Examples 1 and 2 have the approximately same conditions except for the conditions in the separator paper (4).

All of the capacitors (1) have a rated voltage of 20 V, a capacitance of 22 μF, an outer diameter and an outer height of a case (3) of 6.3 mm and 6.0 mm, respectively.

On the capacitors of Examples 1 to 6 and Conventional Examples 1 and 2, a capacitance (Cap, unit: μF) and a dielectric loss tangent (tan δ, unit: %) were measured at a frequency of 120 Hz, and further an equivalent series resistance (ESR, unit: mΩ) was measured at a frequency of 100 Hz. In an ideal capacitor, a phase of a current leads that of a voltage by 90° C., but in an actual capacitor, the phase of a current is behind that of a voltage. The angle δ of this phase lag is referred to as a dielectric loss angle and is generally expressed by a dielectric loss tangent (tan δ). Further, a leakage current (LC, unit: μA) was measured after a lapse of two minutes from the application of a rated voltage. The results of measurements are shown in FIG. 3. Values of electrical characteristics are averages of 20 measurements.

As is evident from the results shown in FIG. 3, the capacitors (1) of Examples 1 to 6 using the separator paper (4) prepared by mixing fibrillated fibers having high heat resistance and fibers having low heat resistance had an ESR characteristic improved better than the capacitors (1) of Conventional Examples 1 and 2. The reason for this is that the fibers having low heat resistance become a state of being "carbonized (get thinner)", "dissolved", and "decomposed", the density in the separator paper is decreased and the voids into which the mixed solution penetrates are increased. In addition, because distances between fibers in the fibers having high heat resistance are small, it becomes possible to minify the respective spaces formed by intersection of fibers and therefore a power of holding the mixed solution can be maintained. Consequently, it is conceivable that the mixed solution in a chemical polymerization method remains in the separator paper (4) in a larger amount and thereby a dense solid electrolyte layer is formed. This effect is enhanced by using polythiophene or derivatives thereof, having a lower polymerization rate than polypyrrol, as a material for the solid electrolyte layer.

In the Examples, the carbonization was performed at 280° C., but a carbonization temperature can be appropriately modified based on a material used for the separator paper (4), and it is not particularly limited as long as a substance prepared by mixing the fibers having high heat resistance and the fibers having low heat resistance is carbonized.

The descriptions of the above-mentioned Examples are intended to illustrate the present invention and are not to be construed to limit the invention described in the scope of the claims or to restrict the scope of the invention. And, the respective constitutions of the present invention are not limited to the above-mentioned Examples and variations may be made within the technical scope described in the scope of the claims.

BRIEF DESCRIPTION OF THE DRAWINGS

FIG. 3 is a table showing measurements of electrical characteristics of capacitors according to Examples and Conventional Samples.

Figure 1:
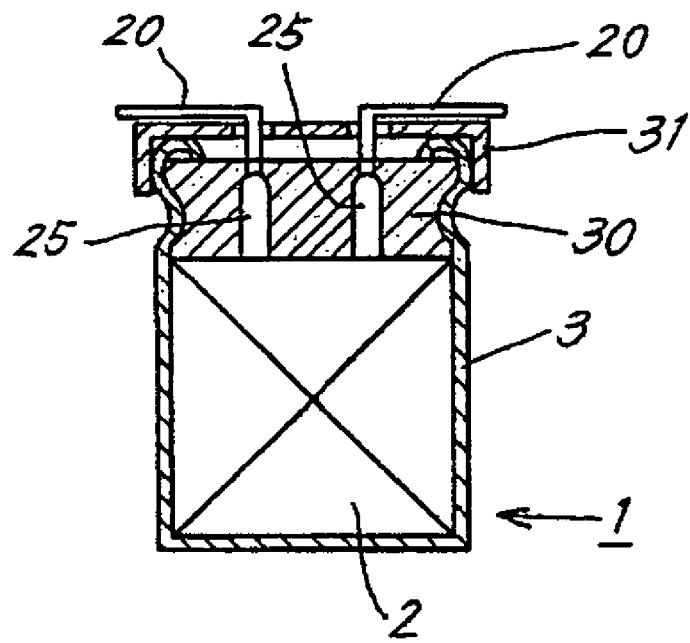
FIG. 1 is a sectional view of a conventional solid electrolytic capacitor.
Figure 2:
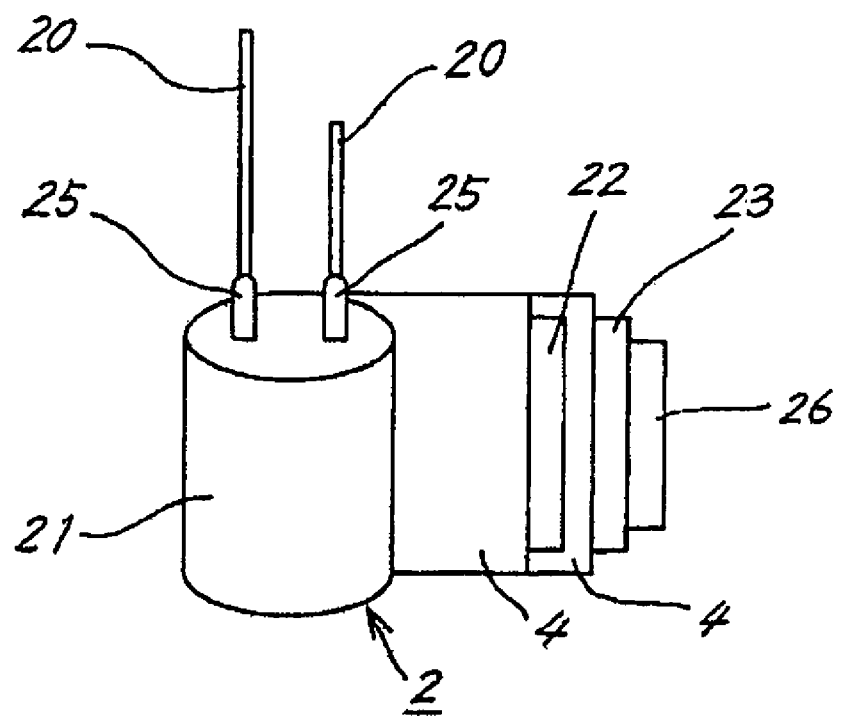
FIG. 2 is an exploded perspective view of a capacitor element in the solid electrolytic capacitor of FIG. 1.

DESCRIPTION OF NUMERICAL REFERENCES (1) solid electrolytic capacitor
(4) separator paper
(21) wound element
(22) anode foil
(23) cathode foil

The invention claimed is:

1. A solid electrolytic capacitor prepared by carbonizing a wound element formed by winding an anode foil and a cathode foil together with a separator paper sandwiched therebetween, and forming a solid electrolyte layer, including said separator, comprising a conductive polymer between the anode foil and the cathode foil, wherein the separator paper is paper prepared by mixing fibers having low heat resistance and carbonized by said carbonizing, and fibers having high heat resistance not carbonized by said carbonizing, and fibrillated fibers having narrow spaces between fibers are used as said fibers having high heat resistance.

2. The solid electrolytic capacitor according to claim 1, wherein said conductive polymer consists of polythiophene or derivatives thereof.

3. The solid electrolytic capacitor according to claim 1, wherein in said separator paper, the content of the fibers having high heat resistance is 10 to 90%.

* * * * *